(12) United States Patent
Ko

(10) Patent No.: US 8,059,348 B2
(45) Date of Patent: Nov. 15, 2011

(54) LENS ADAPTER RING AND LENS MODULE

(75) Inventor: Chun-Cheng Ko, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/693,452

(22) Filed: Jan. 26, 2010

(65) Prior Publication Data

US 2010/0290140 A1  Nov. 18, 2010

(30) Foreign Application Priority Data

May 14, 2009  (CN) .................... 2009 10 302291

(51) Int. Cl.
*G02B 7/02* (2006.01)
(52) U.S. Cl. ....................................................... 359/829
(58) Field of Classification Search .......... 359/822–828, 359/829, 704
See application file for complete search history.

(56) References Cited

U.S. PATENT DOCUMENTS

| | | | | |
|---|---|---|---|---|
| 4,297,002 A * | 10/1981 | Meatabi | ........................ | 359/825 |
| 5,469,300 A * | 11/1995 | Nomura | ........................ | 359/700 |
| 7,259,910 B2 * | 8/2007 | Kuo | ........................... | 359/426 |

* cited by examiner

*Primary Examiner* — Ricky Mack
*Assistant Examiner* — Tuyen Tra
(74) *Attorney, Agent, or Firm* — Altis Law Group, Inc.

(57) ABSTRACT

A lens adapter ring is provided for connecting a lens barrel to a lens holder whose thread specification is different from that of the lens barrel. The ring includes a first hollow cylinder. The cylinder includes a first inner surface and a first outer surface opposite to the first inner surface. The first outer surface includes a first outer thread portion adapted for the lens holder, and the first inner surface includes a first inner thread portion adapted for the lens barrel. The thread specification of the first outer thread portion is different from that of the inner thread portion. A lens module using the lens adapter ring is also provided.

8 Claims, 3 Drawing Sheets

LENS ADAPTER RING AND LENS MODULE

BACKGROUND

1. Technical Field

The present disclosure generally relates to lens modules and, particularly, to a lens module using a lens adaptor ring.

2. Description of Related Art

Normally, one kind of lens holder can only receive those lens barrels whose thread specifications are the same as that of the lens holder. For example, the thread specification of the lens holder is M7×P0.35 mm (the number following the M is the major diameter of the thread in millimeter, and the number following the P is the pitch of the thread in millimeter) can only receive the lens barrel having the same thread specification.

BRIEF DESCRIPTION OF THE DRAWINGS

The components of the drawings are not necessarily drawn to scale, the emphasis instead being placed upon clearly illustrating the principles of a lens adapter ring and a lens module using the same. Moreover, in the drawings, like reference numerals designate corresponding parts throughout several views.

DETAILED DESCRIPTION

Figure 1:
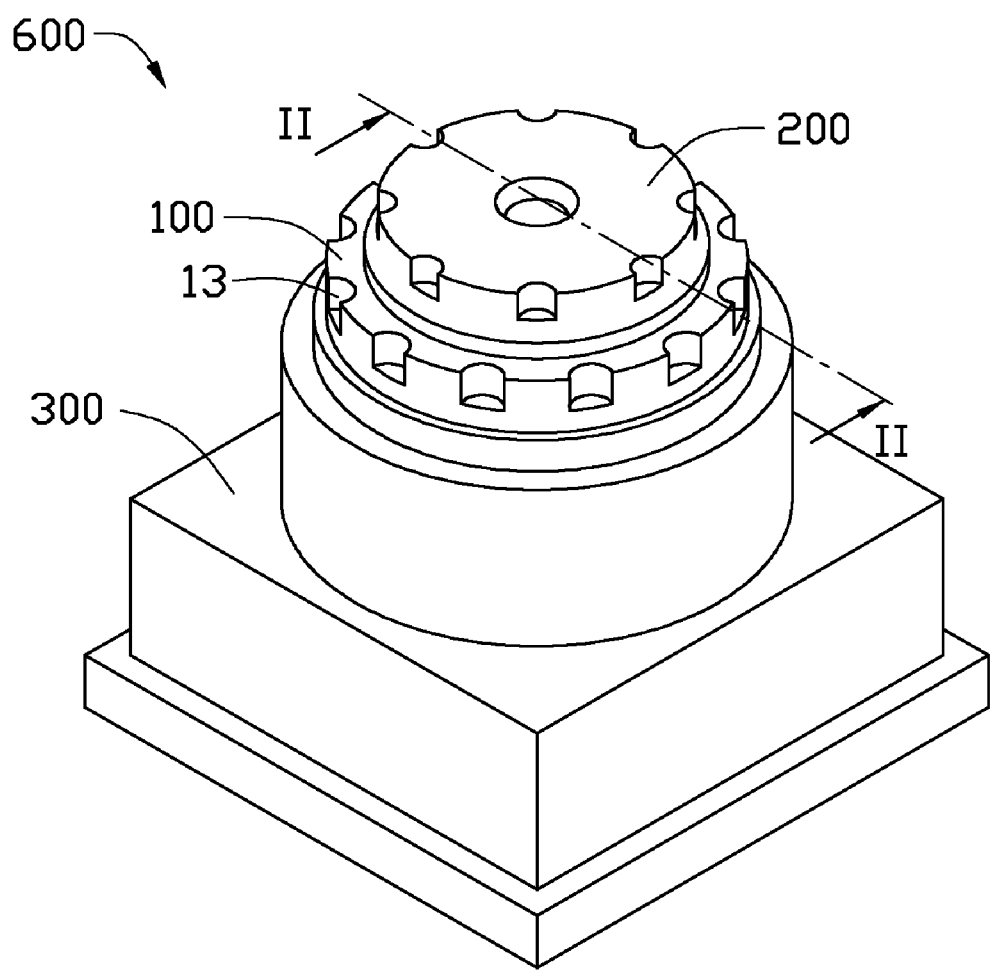
FIG. 1 is an isometric view of a lens module in accordance with an exemplary embodiment, showing a lens adapter ring.
Figure 2:
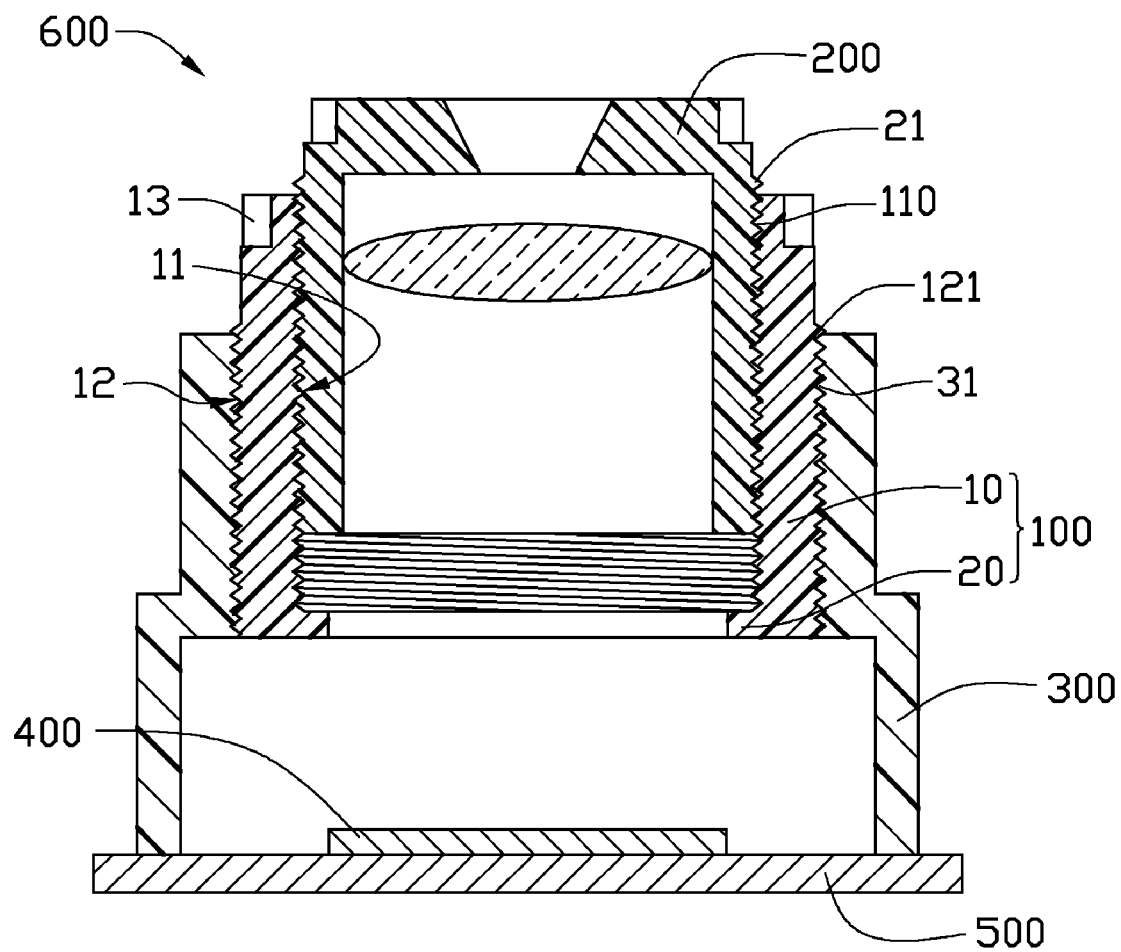
FIG. 2 is a cross-sectional view of the lens module of FIG. 1, taken along the line II-II.

Referring to FIGS. 1-2, a lens module 600 includes a lens adapter ring 100, a lens barrel 200, and a lens holder 300. The ring 100 is configured for connecting the lens barrel 200 to the lens holder 300. In the embodiment, the ring 100 is made of plastic material. The lens barrel 200 includes a first outer thread portion 21, and the lens holder 300 includes a first inner thread portion 31. The thread specification of the first outer thread portion 21 is different from that of the first inner thread portion 31. In the embodiment, the thread specification of the first outer thread portion is M5×P0.35 mm, and the thread specification of the first inner thread portion 31 is M8×P0.35 mm. The lens holder 300 is mounted on a circuit board 500 having an image sensor 400. The light can pass through the lens barrel 200, the ring 100, and the lens holder 300, and project onto the image sensor 400.

The ring 100 includes a hollow cylinder 10 and an internal lip 20. The hollow cylinder 10 includes an inner surface 11 and an outer surface 12. The inner surface 11 includes a second inner thread portion 110, and the outer surface 12 includes a second outer thread portion 121. The first outer thread portion 21 of the lens barrel 200 cooperates with the second inner thread portion 110 to secure the lens barrel 200 to the cylinder 10. The second outer thread portion 121 cooperates with the second inner thread portion 31 to secure the cylinder 10 to the lens holder 300. A plurality of recessed portions 13 is formed on top end of the cylinder 10. The recessed portions 13 are configured for conveniently mounting the ring 100 to the lens module 600 with a clamp (not shown).

The lip 20 is secured to the inner surface 11 of the cylinder 10. In this embodiment, the lip 20 is integrally formed with the hollow cylinder 10. In an alternative embodiment, the lip 20 is threadedly engaged with the hollow cylinder 10. The lip 20 is configured for preventing the lens barrel 200 from extending through the ring 100, thus preventing the lens barrel 200 from damaging the image sensor 400.

The second inner thread portion 110 of the ring 100 cooperates with the first outer thread portion 21 of the lens barrel 200 to secure the lens barrel 200 to the ring 100, and the second outer thread portion 121 cooperates with the first inner thread portion 31 of the lens holder 300 to secure the lens holder 300 to the ring 100, thus the lens barrel 200 can be connected to the lens holder 300 whose thread specification is different from that of the lens barrel 200 via the ring 100.

Figure 3:
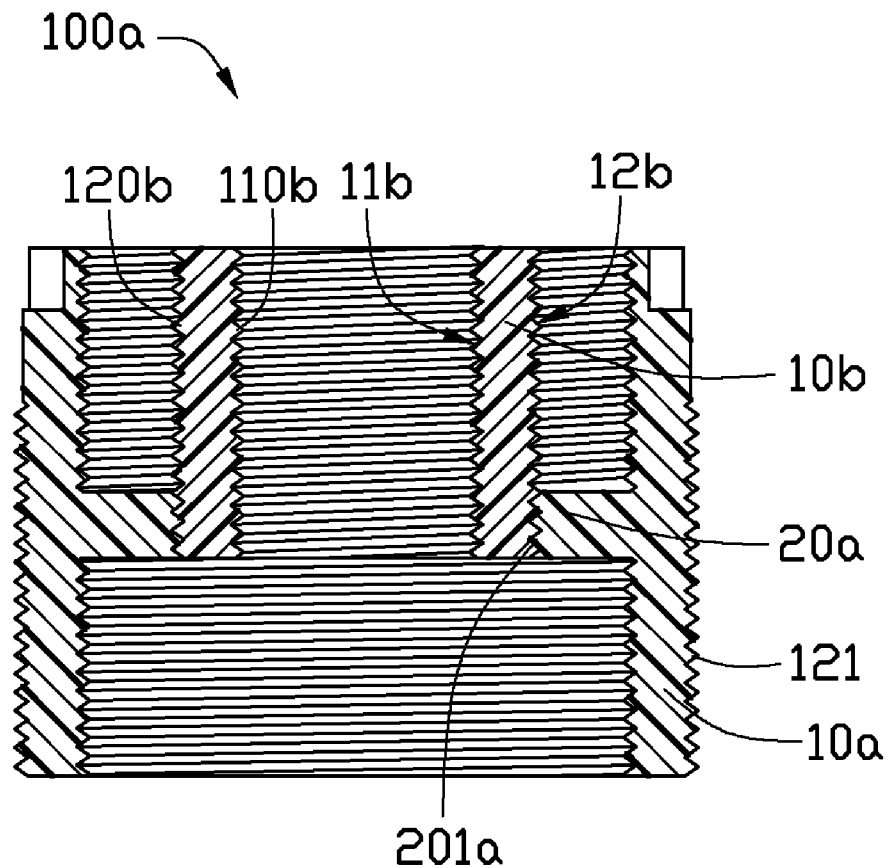
FIG. 3 is a cross-sectional view of a lens adapter ring in accordance with another exemplary embodiment.

Referring also to FIG. 3, a lens adapter ring 100a configured for connecting a lens barrel (not shown) to a lens holder (not shown) is illustrated. In the embodiment, the thread specification of a thread portion of the lens barrel is M5×P0.35 mm or M7×P0.35 mm, and the thread specification of a thread portion of the lens holder is M8×P0.35 mm.

The ring 100a includes a first hollow cylinder 10a, a second hollow cylinder 10b, and an internal lip 20a. The internal lip 20a is secured to the middle of the cylinder 10a. The lip 20 20a includes an inner thread portion 201a. The cylinder 10b includes an inner surface 11b and an outer surface 12b. The outer surface 12b includes an outer thread portion 120b adapted for the inner thread portion 201a of the lip 20a, and the inner surface 11b includes an inner thread portion 110b adapted for the lens barrel which thread specification is M5×P0.35 mm. It should be noted that when the cylinder 10b is removed from the ring 100a, the ring 100a can be used to connect the lens barrel whose thread specification is M7×P0.35 mm to the lens holder.

Comparing to the ring 100 shown in FIG. 1 and FIG. 2, the ring 100a can be used to connect the lens barrel whose thread specification is M5×P0.35 mm to the lens holder using the cylinder 10a, and can also be used to connect the lens barrel whose dimension is M7×P0.35 mm to the lens holder using the cylinder 10b. Therefore, the ring 100a having different cylinders can be used to connect different lens barrels to the lens holder.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A lens adapter ring configured for connecting a lens barrel to a lens holder whose thread specification is different from that of the lens barrel, the lens adapter ring comprising:
   a first hollow cylinder comprising a first inner surface and a first outer surface opposite to the first inner surface, wherein the first outer surface comprises a first outer thread portion adapted for the lens holder, and the first inner surface comprises a first inner thread portion adapted for the lens barrel;
   an internal lip positioned on the first inner surface of the first hollow cylinder; and
   a second hollow cylinder, wherein the second hollow cylinder comprises a second inner surface and a second outer surface opposite to the second inner surface, the second inner surface comprises a second inner thread portion whose thread specification is different from that of the first inner thread portion of the first hollow cylinder, and the second outer surface comprises a second outer thread portion whose thread specification is different from that of the first outer thread portion of the first hollow cylinder, and the internal lip comprises a thread portion adapted for the second outer thread portion of the second hollow cylinder.

2. The lens adapter ring as described in claim 1, wherein the lens adaptor ring is made of plastic material.

3. The lens adapter ring as described in claim 1, wherein a plurality of recessed portions is formed on a top end of the first hollow cylinder.

4. The lens adapter ring as described in claim 1, wherein the internal lip is integrally formed with the first hollow cylinder.

5. A lens module comprising:
- a lens barrel;
- a lens holder whose thread specification is different from that of the lens barrel; and
- a first hollow cylinder comprising a first inner surface and a first outer surface opposite to the first inner surface, wherein the first inner surface comprises a first inner thread portion adapted for the lens barrel, the first outer surface comprises a first outer thread portion adapted for the lens holder;
- an internal lip positioned on the first inner surface of the first hollow cylinder; and
- a second hollow cylinder, wherein the second hollow cylinder comprises a second inner surface and a second outer surface opposite to the second inner surface, the second inner surface comprises a second inner thread portion whose thread specification is different from that of the first inner thread portion of the first hollow cylinder, and the second outer surface comprises a second outer thread portion whose thread specification is different from that of the first outer thread portion of the first hollow cylinder, and the internal lip comprises a thread portion adapted for the second outer thread portion of the second hollow cylinder.

6. The lens module as described in claim 5, wherein the first hollow cylinder, the internal lip, and the second hollow cylinder are made of plastic material.

7. The lens module as described in claim 5, wherein a plurality of recessed portions is formed on a top end of the first hollow cylinder.

8. The lens module as described in claim 5, wherein the internal lip is integrally formed with the first hollow cylinder.

* * * * *